US006429768B1

(12) United States Patent
Flick

(10) Patent No.: US 6,429,768 B1
(45) Date of Patent: Aug. 6, 2002

(54) VEHICLE CONTROL SYSTEM INCLUDING TRANSPONDER JAMMER AND RELATED METHODS

(76) Inventor: Kenneth E. Flick, 5236 Presley Pl., Douglasville, GA (US) 30135

(*) Notice: Subject to any disclaimer, the term of this patent is extended or adjusted under 35 U.S.C. 154(b) by 0 days.

(21) Appl. No.: 09/392,805

(22) Filed: Sep. 9, 1999

(51) Int. Cl.$^7$ .............................. G06F 7/04; G08C 19/00
(52) U.S. Cl. ...................... 340/5.2; 340/5.31; 340/5.61; 340/10.1; 340/10.51; 340/825.69; 340/425.5; 340/426; 455/1; 307/10.5
(58) Field of Search ........................ 340/5.1, 5.2, 5.31, 340/5.6, 5.61, 10.51, 10.1, 425.5, 426, 825.72, 825.69; 235/382; 455/1; 307/10.2, 10.5; 342/14

(56) References Cited

U.S. PATENT DOCUMENTS

| 4,383,242 A | | 5/1983 | Sassover et al. ............... 340/64 |
| 4,498,193 A | * | 2/1985 | Richardson ..................... 455/1 |
| 5,146,215 A | | 9/1992 | Drori ...................... 340/825.32 |
| 5,252,966 A | | 10/1993 | Lambropoulos et al. ...................... 340/825.69 |
| 5,897,598 A | | 4/1999 | Puetz ............................ 701/35 |
| 5,905,444 A | | 5/1999 | Zimmer ................... 340/825.31 |
| 5,955,969 A | * | 9/1999 | D'Hont ............................. 455/1 |
| 6,112,052 A | * | 8/2000 | Guthrie et al. ................... 455/1 |

FOREIGN PATENT DOCUMENTS

WO    WO 95/15029    *    6/1995

OTHER PUBLICATIONS

Tiris, Automotive Security, "Toyota Sells European Cars With TIRIS Immobilizers" (1998).
Tiris, Automotive Security, "Siemens Adds New Twist to Secure Key" (1998).
Tiris, Automotive Security, "Hyundai Adds TIRIS to European Models" (1998).
Philips, "Access and Immobilization Systems" (1999).
Sentinel ID Systems, Inc., "Sentinel ID Systems & Tiris Bring the Latest in Auto Anti–Theft Technology" Aug. 1999.
Tiris, "TIRIS RFID Evaluation Kits" (1998), Texas Instruments.
Tiris, Technology by Texas Instruments, "Readers and Antennas" (1998).
Texas Instruments, Product Bulletin, "High Performance LF Radio Frequency Modules" (1999).
Tiris, "Readers and Antennas" (1998) Texas Instruments.
Tiris, "Transponders" (1998) Texas Instruments.

* cited by examiner

Primary Examiner—Donnie L. Crosland
(74) Attorney, Agent, or Firm—Allen, Dyer, Doppelt, Milbrath & Gilchrist, P.A.

(57) ABSTRACT

A vehicle control system includes a radio transponder to be carried by a user, and a radio transponder reader at the vehicle for generating control signals to enable at least one vehicle function based upon receiving a desired radio signal from the radio transponder when positioned in proximity to the reader. A jammer radio transmitter at the vehicle selectively prevents the radio transponder reader from receiving the desired radio signal from the radio transponder based upon a controller, such as an alarm controller of a vehicle security system, especially an after-market security system. The controller preferably includes a receiver for receiving remotely generated signals to operate the jammer radio transmitter. The control system may also include a remote transmitter for generating control signals to be received by the receiver. For example, the remote transmitter may be a portable transmitter carried by the user, or may be a satellite, cellular or paging transmitter remote from the vehicle. A vehicle anti-hijack switch may control the transponder jammer. The at least one vehicle function may be operation of a vehicle engine or control of the vehicle door locks.

41 Claims, 3 Drawing Sheets

VEHICLE CONTROL SYSTEM INCLUDING TRANSPONDER JAMMER AND RELATED METHODS

FIELD OF THE INVENTION

The present application is related to the field of vehicle systems and, more particularly, to a vehicle control system and related methods.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

A relatively new development in the field of vehicle security relates to a transponder adapted to be carried by the vehicle user, such as on a key ring. The transponder is uniquely coded and this code must be received by a transponder reader at the vehicle, such as to permit vehicle starting. The reader includes a transmitter for temporarily charging a capacitor in the transponder so that the transponder can then transmit its unique code. The transponder requires no batteries, is relatively small, and can be sealed to avoid damage from moisture.

The transponder feature means that a would-be thief can no longer break the ignition switch housing to start the vehicle. Instead possession of the properly coded transponder is required or the vehicle will not start. Some variations of the transponder technology can eliminate the need for the traditional mechanical key altogether. A number of manufacturers offer such transponder and reader systems including Texas Instruments of Dallas, Tex. under the designation TIRIS. U.S. Pat. No. 5,905,444 to Zimmer and U.S. Pat. No. 5,897,598 to Puetz disclose further developments in the vehicle transponder security area.

Unfortunately, the majority of vehicle security systems need to be directly connected by wires to individual vehicle devices, such as the vehicle horn or door switches of the vehicle. In other words, a conventional vehicle security system is hardwired to various vehicle components, typically by splicing into vehicle wiring harnesses or via interposing T-harnesses and connectors. Connecting to a vehicle which includes a transponder reader and engine control circuit is further complicated. Moreover, another difficulty is that vehicle manufacturers discourage cutting and splicing into existing wiring to install aftermarket components. For example, a vehicle manufacturer may void a warranty for such activity.

SUMMARY OF THE INVENTION

In view of the foregoing background, it is therefore an object of the present invention to provide a vehicle control system and related method including additional control and/or security features in a vehicle that includes a transponder security feature.

It is another object of the present invention to provide a vehicle control system and related method that permits a simple interface of a vehicle security system into a vehicle including a transponder security feature.

These and other objects, features and advantages in accordance with the present invention are provided by a vehicle control system comprising a radio transponder to be carried by a user, a radio transponder reader at the vehicle for enabling at least one vehicle function based upon receiving a desired radio signal from the radio transponder when positioned in proximity therewith, and a jammer radio transmitter at the vehicle. The jammer radio transmitter selectively prevents the radio transponder reader from receiving the desired radio signal from the radio transponder, such as in response to control signals from a controller. The controller may be an alarm controller of a vehicle security system, especially an after-market security system where it is desired not to cut or splice into existing wiring.

The controller may comprise a receiver for receiving remotely generated signals to operate the jammer radio transmitter. The control system may also include a remote transmitter for generating control signals to be received by the receiver of the controller. For example, the remote transmitter may be a portable transmitter carried by the user, or may be a satellite, cellular or paging transmitter remote from the vehicle. An anti-hijack switch may also activate the jammer radio transmitter.

The at least one vehicle function in one embodiment is operation of a vehicle engine. In another embodiment, the at least one vehicle function may be permitting access through a vehicle door, that is, control of the door locks. In other words, the radio transponder may be positioned adjacent a door to unlock the doors, or may enable engine starting when positioned within the vehicle.

The control system may include at least one vehicle sensor, and the controller may activate the jammer radio transmitter responsive to the at least one vehicle sensor. Accordingly, the jammer radio transmitter is not powered until the transponder is about to be used, thus conserving vehicle battery power. For example, the vehicle security sensor may be a vehicle proximity sensor, a door or door lock position sensor, or an ignition switch sensor. Of course, an alarm controller is advantageously connected to various vehicle sensors for its traditional security monitoring functions.

The radio transponder may preferably be a passive radio transponder. Accordingly, the radio transponder reader may include a powering radio transmitter for powering the passive radio transponder.

The jammer radio transmitter may operate in several ways. For example, it may generate a noise signal to block successful reception of the desired radio signal from the radio transponder. In embodiments where the transponder generates a uniquely coded desired radio signal, the jammer radio transmitter may generate an incorrect code to block successful reception of the uniquely coded desired radio signal.

A method aspect of the invention is for vehicle control and preferably comprises the steps of: using a radio transponder reader at the vehicle to selectively enable at least one vehicle function based upon receiving a desired radio signal from a radio transponder when positioned in proximity, and selectively operating a jammer radio transmitter at the vehicle for preventing the radio transponder reader from receiving the desired radio signal from the radio transponder. The selective jamming may be responsive to jammer control signals. A receiver, such as part of an alarm controller, may be used for receiving remotely generated jammer control signals. The jammer radio transmitter may also be operated in response to an anti-hijack switch at the vehicle. The at least one vehicle function may be operation of a vehicle engine, or permitting access through a vehicle door, for example.

BRIEF DESCRIPTION OF THE INVENTION

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime and double prime notation are used in alternate embodiments to indicate similar elements.

Figure 1:
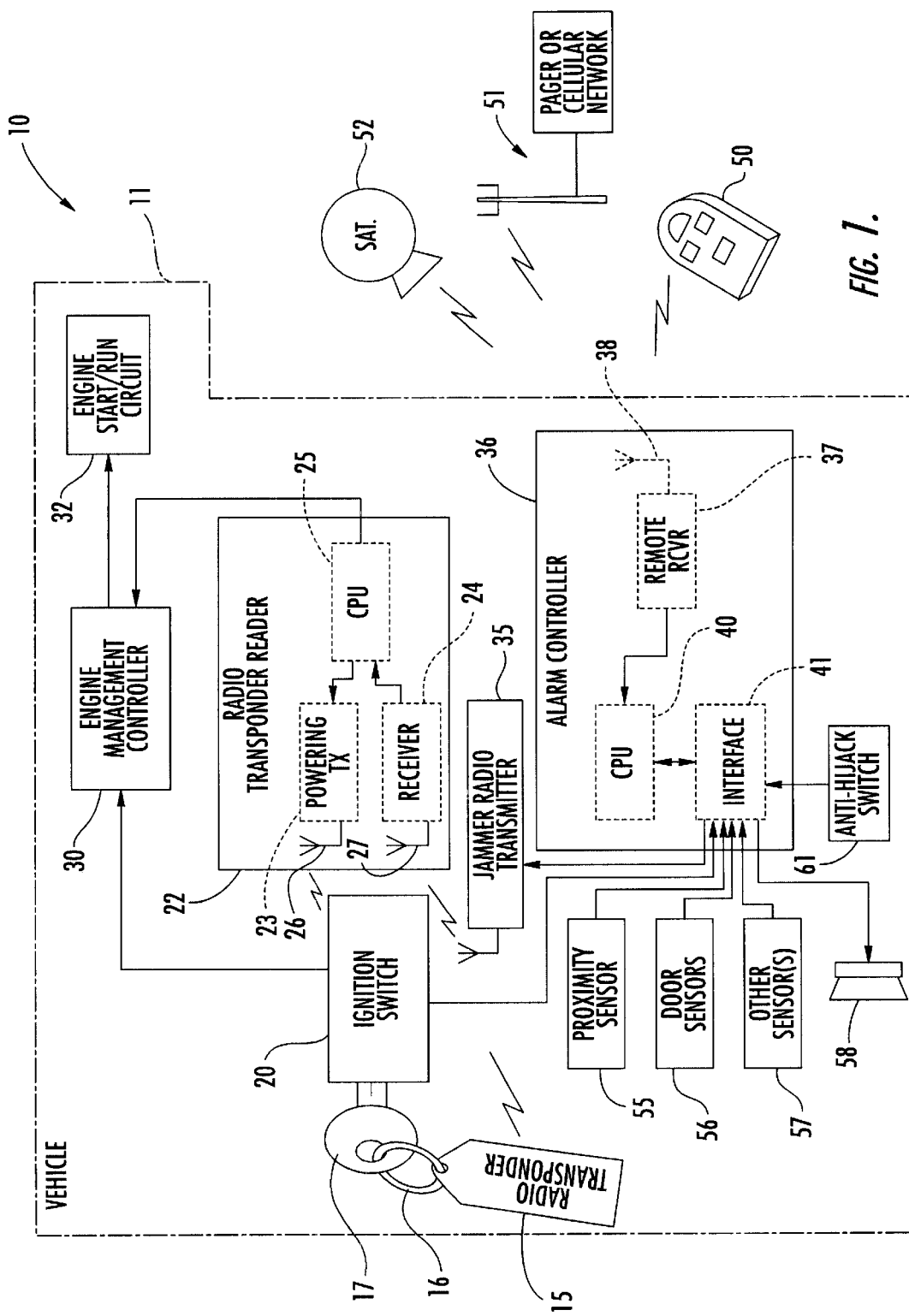
FIG. 1 is a schematic block diagram of a first embodiment of a vehicle control system in accordance with the present invention.

Referring initially to FIG. 1 a first embodiment of a vehicle control system 10 for a vehicle 11 in accordance with the invention is now described. The vehicle control system 10 includes a radio transponder 15 to be carried by a user. The radio transponder 15 is attached to a key ring 16 which, in turn, carries a conventional vehicle key 17 in the illustrated embodiment. In other embodiments, the key 17 may not need to be mechanically coded, but can simply be used to rotate the ignition switch 20 as will be readily appreciated by those skilled in the art. In other embodiments, the key 17 may not be needed since the transponder 15 alone can provide the required degree of security.

The radio transponder 15 can be of a conventional type, such as offered by Texas Instruments under the designation TIRIS. Other manufacturers' radio transponders 15 will also be suitable. The radio transponder 15 is typically hermetically sealed, since it requires no battery or replacement thereof. The radio transponder 15 typically includes a receiving circuit for receiving power radiated from the powering transmitter 23 of the reader 22, and a capacitor for storing charge to power transmission of the desired coded signal from a transmitter, as will be appreciated by those skilled in the art. The radio transponder 15 is preferably a passive transponder in the sense that it does not require its own a battery for operation. Accordingly, the radio transponder 15 may be fairly rugged and resistant to moisture damage as will also be appreciated by those skilled in the art.

The control system 10 also includes the illustrated radio transponder reader 22 at the vehicle for enabling at least one vehicle function based upon receiving a desired radio signal from the radio transponder when positioned in proximity therewith. The transponder reader 22 may also be a conventional reader as also sold under the designation TIRIS by Texas Instruments. The reader 22 illustratively includes a powering transmitter 23, a receiver 24, and a central processing unit (CPU) 25 providing control of the powering transmitter and receiver and other communications functions as will be appreciated by those skilled in the art. The reader 22 may include self-contained respective antennas 26, 27 for the powering transmitter 23 and receiver 24. Alternately, one or both of these antennas 26, 27 may be mounted externally of the reader circuit board and adjacent the ignition switch 20, for example.

The powering transmitter 23 may be activated when the key 17 is received in the ignition switch 20 or the ignition switch is rotated to or past a first rotational position, for example. Accordingly, the powering transmitter 23 need not be constantly powered thereby reducing unnecessary battery drain.

As shown in the illustrated embodiment, the radio transponder reader 22 is connected to the engine management controller 30. The engine management controller 30, in turn, is connected to an engine start and/or run control circuit 32. Accordingly, the engine management controller 30 may control operation of the vehicle engine, and only permit the engine to operate if a properly coded radio transponder 15 is presented to the reader 22 as will be appreciated by those skilled in the art. A properly coded radio transponder 15 and reader 22 combination may use a rolling code for greater security in certain embodiments.

The components and circuitry described so far have focused on a conventional radio transponder 20 and reader 22 that are sometimes referred to as providing an immobilizer feature, wherein the engine of the vehicle 11 cannot be started or permitted to run unless a properly coded transponder 15 is positioned adjacent the ignition switch 20 within the vehicle.

Unfortunately, interfacing a typical vehicle security system with such an immobilizer feature may be relatively difficult. For example, cutting or splicing into existing wiring of the vehicle may be time consuming and may void certain manufacturer's warranties. The present invention overcomes such difficulties in a relatively straightforward and elegant manner. In particular, the vehicle control system 10 also includes a jammer radio transmitter 35 at the vehicle 11. The jammer radio transmitter 35 selectively prevents the radio transponder reader 22 from receiving the desired radio signal from the radio transponder 15.

In the illustrated embodiment, the jammer radio transponder 35 is connected to and controlled by the illustrated alarm controller 36. In other embodiments, a controller other than an alarm controller may selectively operate the jammer radio transmitter 35 as will become more apparent with reference to the ensuing description. The term "jammer radio transponder" is meant to cover a number of possible operating modes. For example, the jammer radio transmitter 35 may generate sufficient energy in the receiver passband, such as white noise, that the receiver 24 is unable to detect the relatively weaker signals from the radio transponder 15. In other modes, the jammer radio transmitter 35 may generate a uniquely coded radio signal that is an incorrect code which thereby blocks successful reception of the uniquely coded desired radio signal from the radio transponder 15.

The alarm controller 36 includes a remote receiver 37 and associated antenna 38 for receiving remotely generated signals which may cause operation of the jammer radio transmitter 35. The alarm controller 36 also illustratively includes interface circuitry 41 for interfacing to various sensors and other vehicle components and a central processing unit (CPU) 40 for performing the various processing functions as will be readily understood by those skilled in the art.

In the illustrated embodiment, the alarm controller 36 is connected to the proximity sensor 55, the door sensors 56, the ignition switch 20, and other sensors 57, such as door and hood pin switches, for example. The alarm controller 36 is also illustratively connected to the siren 58, such as for giving the alarm indication at the vehicle when one or more of the sensors is triggered and the alarm controller is in the armed mode, for example.

As will be readily appreciated by those skilled in the art, an alarm controller 36 is typically switchable between armed and disarmed modes. This is typically done via the remote handheld transmitter 50 which is carried by the user. In the armed mode, the alarm controller 36 is capable of generating an alarm indication via the siren 58 if a sensor is triggered. It is often desirable that if the alarm is triggered, the vehicle engine also be prevented from starting or running. This feature is readily and easily incorporated in accordance with a significant advantage of the present invention, by activating the jammer radio transmitter 35. When the jammer radio transmitter 35 is activated by the alarm controller 36, the alarm controller essentially uses the existing immobilizing feature with the simple radio interface. No wires need be cut or spliced to obtain the immobilizing feature as will be appreciated by those skilled in the art.

Although a handheld remote transmitter 50 may typically be used to operate the alarm controller 36 and thus the jammer radio transmitter 35, other remote transmitters may also be used. For example, as illustrated the remote signal to cause the jammer radio transmitter 35 to operate or be capable of operating, can come from a satellite 52, or cellular or pager network 51. Accordingly, a vehicle owner may use a cellular telephone to immobilize the vehicle, or may call a paging service and enter an appropriate code to immobilize the vehicle.

In addition, an anti-hijack switch 61, concealed within the vehicle 11 yet accessible to the driver, may also activate the jammer radio transmitter 35. The anti-hijack switch 61 may have a delay associated therewith to disable the vehicle after the owner is out of the car, or may be configured to prevent restarting of the vehicle even if the hijacker has possession of the key 17 and the properly coded radio transponder 15.

Again to conserve battery power in the vehicle 11, the control system 10 may include at least one vehicle sensor, and the alarm controller 36 may activate the jammer radio transmitter 35 responsive to the at least one vehicle sensor.

Accordingly, the jammer radio transmitter 35 is not powered until the transponder 15 is about to be used. For example, the proximity sensor 55, a door or door lock position sensor 56, or a sensor for the ignition switch 20 may be used to determine activation of the jammer radio transmitter 35. The alarm controller 36 is advantageously connected to various vehicle sensors for its traditional security monitoring functions as will be appreciated by those skilled in the art. In addition, the jammer radio transmitter 35 need not be activated when the alarm controller 36 is in the disarmed state.

Figure 2:
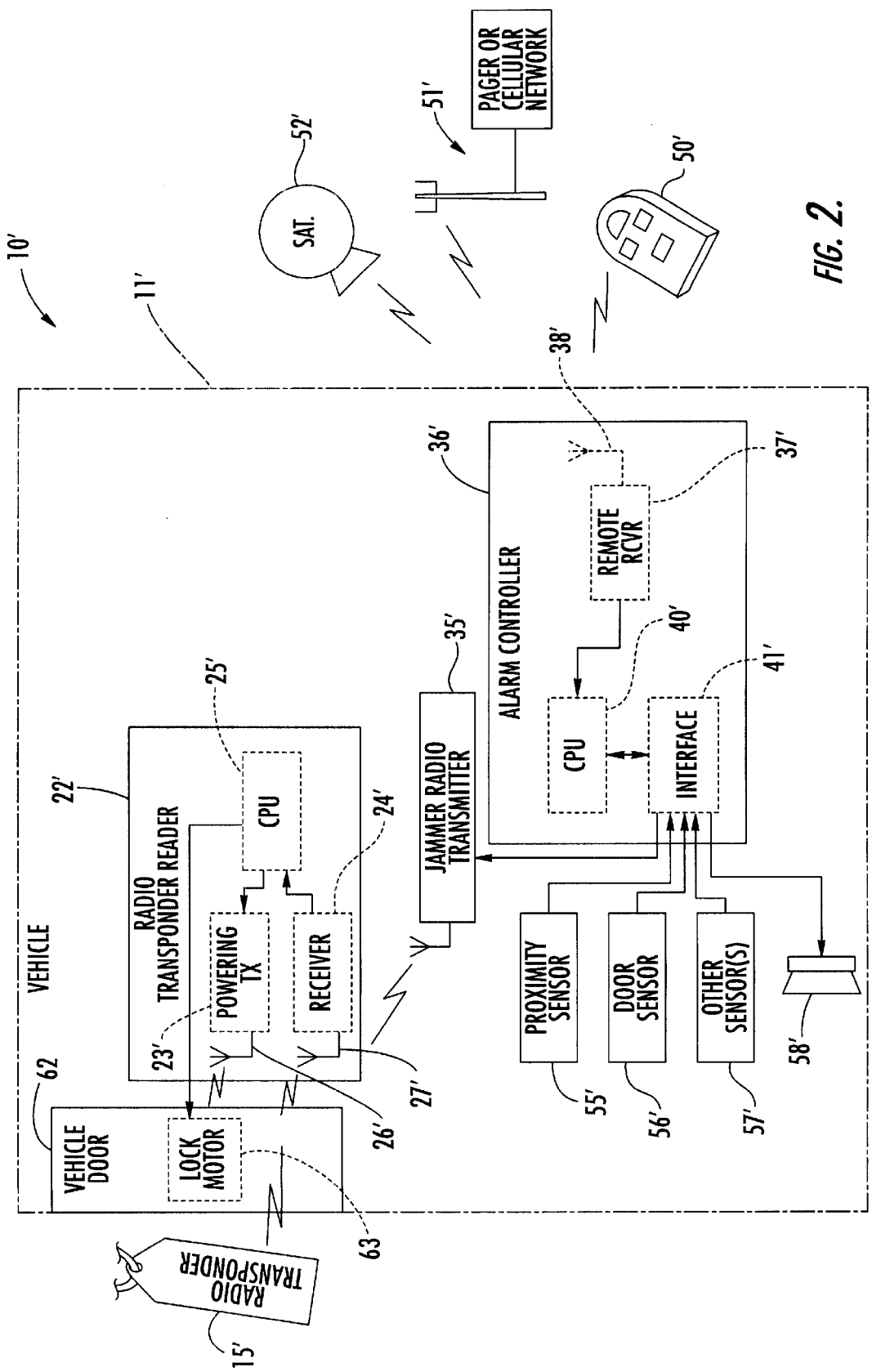
FIG. 2 is a schematic block diagram of a second embodiment of a vehicle control system in accordance with the present invention.

Turning now additionally to FIG. 2 another embodiment or application of the jammer radio transmitter 35' in accordance with the invention is now described in a vehicle access control system 10'. In this embodiment, elements similar to those described above for the control system 10 are indicated with prime notation. These similar elements need no further discussion. In this embodiment, the radio transponder 15' is adapted to permit or grant access through the vehicle door 62.

More particularly, the radio transponder reader 22' or its antenna 27' may be positioned to receive the desired coded signal from the radio transponder 15' when it is positioned adjacent a vehicle door 62, such as the driver's door, for example. Upon receipt of the correct coded signal, the radio transponder reader 22' may cause the door lock motor 63 to unlock the selected vehicle door 62. To provide an additional level of security, the alarm controller 36' may activate the jammer radio transmitter 35' if the controller is not first switched to the disarmed mode. In this embodiment, activation of the jammer radio transmitter 35' may be based upon sensing a person adjacent the vehicle 11' using the proximity sensor 55', such as a radar proximity sensor, as will be understood by those skilled in the art.

As in the first embodiment, in this second embodiment remote transmitters 50', 51', 52' may be used to operate the jammer radio transmitter 35' as will be appreciated by those skilled in the art. Of course, the engine starting and run control feature as shown in FIG. 1 may also be incorporated in combination with the access control feature as shown in the embodiment of FIG. 2.

Figure 3:
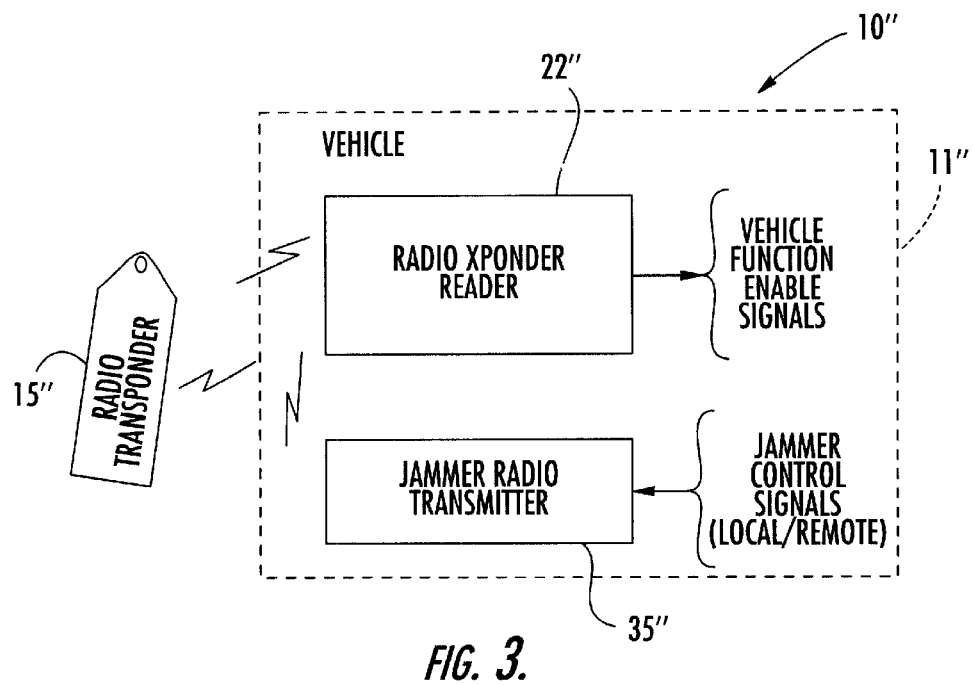
FIG. 3 is a simplified schematic block diagram of the invention.
Figure 4:
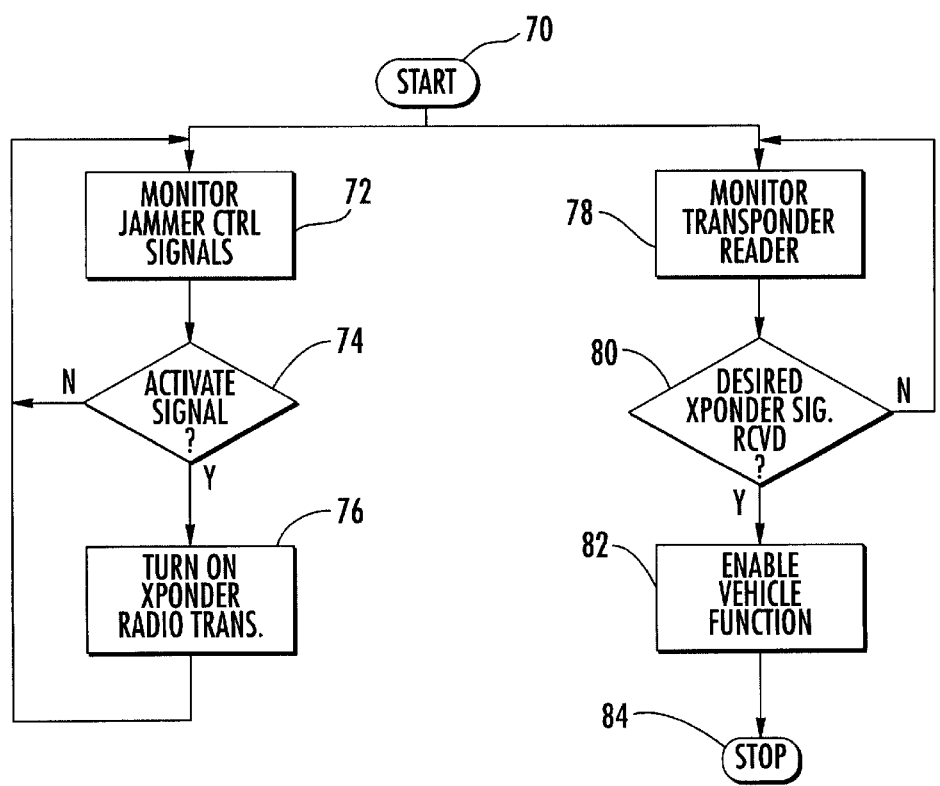
FIG. 4 is a flowchart for the method of the present invention.

Referring now to the simplified schematic diagram of FIG. 3 and the flow chart of FIG. 4, a method aspect of the invention is now described. The method is for vehicle control. From the start (Block 70), the radio transponder reader 22" at the vehicle 11" is monitored to selectively enable at least one vehicle function based upon receiving a desired radio signal from a radio transponder 15" when positioned in proximity to the reader as determined at Block 80. In other words, if the correct or desired coded signal is received by the reader 22" as determined at Block 80, then the vehicle function is enabled at Block 82, and the operation stops (Block 84).

A jammer radio transmitter 35" is also provided at the vehicle 11" and is for preventing the radio transponder reader 22" from receiving the desired radio signal from the radio transponder 15", such as responsive to the illustrated jammer control signals. These jammer control signals may be generated locally within the vehicle, remotely from the vehicle, or based upon both remote signals and local conditions as described above. The jammer control signals are monitored at Block 72 and if an activate command signal is determined at Block 74, then the jammer radio transmitter 35" is turned on at Block 76. The jammer radio transmitter 35" prevents the transponder reader 22" from receiving the desired coded signal from the radio transponder 35" to That which is claimed is:

1. A vehicle control system comprising:
   a radio transponder to be carried by a user;
   a radio transponder reader at the vehicle for enabling at least one vehicle function responsive to receiving a desired radio signal from said radio transponder when positioned in proximity therewith; and
   a jammer radio transmitter at the vehicle for selectively preventing said radio transponder reader from receiving the desired radio signal from said radio transponder.

2. A vehicle control system according to claim 1 further comprising a controller at the vehicle for controlling said jammer radio transmitter.

3. A vehicle control system according to claim 2 wherein said controller comprises a receiver for receiving remotely generated signals to operate said jammer radio transmitter.

4. A vehicle control system according to claim 3 further comprising a remote transmitter for generating signals to be received by said receiver of said controller.

5. A vehicle control system according to claim 4 wherein said controller comprises an alarm controller switchable between an armed mode capable of generating an alarm and a disarmed mode responsive to respective arm and disarm remote control signals from said remote transmitter; and wherein said remote transmitter is a portable remote transmitter carried by the user.

6. A vehicle control system according to claim 4 wherein said remote transmitter comprises at least one of a satellite transmitter, a cellular telephone network transmitter, and a paging network transmitter.

7. A vehicle control system according to claim 1 further comprising an anti-hijack switch at the vehicle for controlling said jammer radio transmitter.

8. A vehicle control system according to claim 1 wherein said at least one vehicle function is operation of a vehicle engine.

9. A vehicle control system according to claim 1 wherein said at least one vehicle function is permitting access through a vehicle door.

10. A vehicle control system according to claim 1 further comprising a controller at the vehicle and at least one vehicle sensor connected to said controller; and wherein said controller activates said jammer radio transmitter responsive to said at least one vehicle sensor.

11. A vehicle control system according to claim 10 wherein said at least one vehicle security sensor comprises a vehicle proximity sensor.

12. A vehicle control system according to claim 10 wherein said at least on e vehicle security sensor comprises a door position sensor.

13. A vehicle control system according to claim 10 wherein said at least one vehicle security sensor comprises an ignition switch sensor.

14. A vehicle control system according to claim 1 wherein said radio transponder is a passive radio transponder; and wherein said radio transponder reader includes a powering radio transmitter for powering said passive radio transponder.

15. A vehicle control system according to claim 1 wherein said jammer radio transmitter generates a noise signal to block successful reception of the desired radio signal from said radio transponder.

16. A vehicle control system according to claim 1 wherein said radio transponder generates a uniquely coded desired radio signal; and wherein said jammer radio transmitter generates an incorrect code to block successful reception of the uniquely coded desired radio signal.

17. A vehicle control system comprising:
   a radio transponder to be carried by a user;
   a radio transponder reader at the vehicle for enabling at least one vehicle function based upon receiving a desired radio signal from said radio transponder when positioned in proximity therewith;
   an alarm controller at the vehicle and being switchable between an armed mode being capable of generating an alarm and a disarmed mode; and
   a jammer radio transmitter at the vehicle and connected to said alarm controller for selectively preventing said radio transponder reader from receiving the desired radio signal from said radio transponder when said alarm controller is in the armed mode.

18. A vehicle control system according to claim 17 wherein said alarm controller further comprises a receiver for receiving remotely generated signals to operate said jammer radio transmitter.

19. A vehicle control system according to claim 18 further comprising a remote transmitter for gerating signals to be received by said receiver of said alarm controller.

20. A vehicle control system according to claim 19 wherein said remote transmitter is a portable remote transmitter carried by the user.

21. A vehicle control system according to claim 19 wherein said remote transmitter comprises at least one of a satellite transmitter, a cellular telephone network transmitter, and a paging network transmitter.

22. A vehicle control system according to claim 17 further comprising an anti-hijack switch at the vehicle for controlling said jammer radio transmitter.

23. A vehicle control system according to claim 17 wherein said at least one vehicle function is operation of a vehicle engine.

24. A vehicle control system according to claim 17 wherein said at least one vehicle function is permitting access through a vehicle door.

25. A vehicle control system according to claim 17 further comprising at least one vehicle sensor; and wherein said alarm controller activates said jammer radio transmitter responsive to said at least one vehicle sensor.

26. A vehicle control system according to claim 25 wherein said at least one vehicle security sensor comprises a vehicle proximity sensor.

27. A vehicle control system according to claim 25 wherein said at least one vehicle security sensor comprises a door position sensor.

28. A vehicle control system according to claim 25 wherein said at least one vehicle security sensor comprises an ignition switch sensor.

29. A vehicle control system according to claim 17 wherein said radio transponder is a passive radio transponder; and wherein said radio transponder reader includes a powering radio transmitter for powering said passive radio transponder.

30. A vehicle control system according to claim 17 wherein said jammer radio transmitter generates a noise signal to block successful reception of the desired radio signal from said radio transponder.

31. A vehicle control system according to claim 17 wherein said radio transponder generates a uniquely coded desired radio signal; and wherein said jammer radio transmitter generates an incorrect code to block successful reception of the uniquely coded desired radio signal.

32. A method for vehicle control comprising the steps of:
   using a radio transponder reader at the vehicle for generating control signals to enable at least one vehicle function based upon receiving a desired radio signal from a radio transponder when positioned in proximity therewith; and
   selectively operating a jammer radio transmitter at the vehicle for preventing the radio transponder reader from receiving the desired radio signal from the radio transponder.

33. A method according to claim 32 wherein the step of selectively operating the jammer radio transmitter is in response to receiving remotely generated jammer control signals.

34. A method according to claim 32 wherein the step of selectively operating the jammer radio transmitter is in response to an alarm controller being in an armed mode.

35. A method according to claim 32 wherein the step of selectively operating the jammer radio transmitter is in response to an anti-hijack switch at the vehicle.

36. A method according to claim 32 wherein the at least one vehicle function is operation of a vehicle engine.

37. A method according to claim 32 wherein the at least one vehicle function is permitting access through a vehicle door.

38. A method according to claim 32 wherein the step of selectively operating the jammer radio transmitter is in response to at least one vehicle sensor.

39. A method according to claim 38 wherein the at least one vehicle security sensor comprises a vehicle proximity sensor.

40. A method according to claim 38 wherein the at least one vehicle security sensor comprises a door position sensor.

41. A method according to claim 38 wherein the at least one vehicle security sensor comprises an ignition switch sensor.

* * * * *